United States Patent Office 3,328,398
Patented June 27, 1967

3,328,398
ISOCYANURIC ACID (CARBAMYL N-SUBSTI-
TUTED) BIS- OR TRIS-N-DERIVATIVES AND
THEIR PREPARATION
Gilbert Cousserans and Robert Amanrich, Haute Garonne,
France, assignors to Office National Industriel de
l'Azote, Toulouse, France, a corporation of France
No Drawing. Filed Jan. 22, 1965, Ser. No. 427,504
Claims priority, application France, Jan. 24, 1964,
4,941
17 Claims. (Cl. 260—248)

Isocyanuric acid, a triazinic compound obtained by urea pyrolysis, has been the subject of extensive theoretical work in recent years and its numerous derivatives studied are likely to find promising commercial outlets.

The present invention is concerned with certain derivatives of isocyanuric acid where the molecule contains two or three >N—CO—NH groups represented by the developed formulas

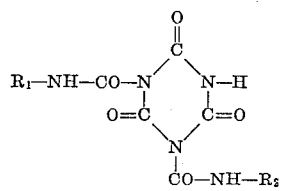

and

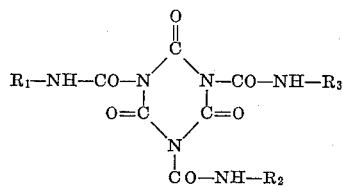

wherein $R_1$, $R_2$ and $R_3$ represent identical or different monovalent radicals constituted by a saturated or unsaturated aliphatic or cyclic (e.g. alicyclic or aromatic) residue, occasionally bearing one or more halogenated, nitrated, sulfonated, etc., substituents. Particularly useful compounds are those wherein $R_1$, $R_2$ and $R_3$ represent the monovalent radicals containing heteroatoms, having nitrated, sulphonated, phosphorylated, halogenated (Cl, Br, I, F), silicon containing, etc. substituents. It is also preferred that $R_1$, $R_2$ and $R_3$ be identical.

Where R is a saturated or unsaturated aliphatic radical, normal or branched, it contains 1 to 7 carbon atoms. Where R is aromatic it comprises $C_6H_5$— or $CH_3C_6H_4$—. Where R is alicyclic it comprises the cyclohexanes and cyclohexenes.

The invention is also concerned with the synthesis of the above derivatives from isocyanuric acid and an isocyanic ester of the corresponding amine in the presence of phosgene.

Owing to the presence of group >N—CO—NH in the molecular structure of the products obtained according to the invention, these products have extremely attractive properties, especially in the field of fungicides, algicides, insecticides, and are also useful in the fields of pharmaceuticals, plastics and textiles, for instance.

The isocyanuric acid (carbamyl N-substituted) bis- and tris-N-derivatives are prepared by reacting isocyanuric acid with the respective stoichiometric amount of 2 or 3 moles, per mole of isocyanuric acid, of an ester or a mixture of isocyanic esters of formula R—N—CO wherein R represents a monovalent aliphatic, alicyclic, or cyclic residue occasionally bearing one or more halogenated, nitrated, sulfonated, etc., groups, the reaction taking place in an anhydrous solvent, chemically inert with respect to the reactants.

The reaction is carried out at 150–200° C. under atmospheric or higher pressures, the pH of the medium being maintained at a value above 12 by adding inorganic bases such as sodium and potassium hydroxides or organic bases such as tertiary amines, quaternary ammonium hydroxides, etc. The weight proportion of base with respect to isocyanuric acid is not limited and it has been ascertained that yields remain at maximum values with ratios varying within wide limits between 1 and more than 10%.

As a rule, the solvents or the mixture of selected solvents, such as dimethyl sulfoxide, dimethyl formamide, benzene, etc., should have a rather high boiling point where the reaction is carried out under atmospheric pressure. The amount of solvent used is preferably such that the whole of the original isocyanuric acid may be in the dissolved state under the selected operating conditions.

The reaction time is rather short, about 30 to 60 minutes, but it is possible to shorten the above time while improving the yields by using specific anticatalysts which inhibit the polymerization reactions of the isocyanic ester.

It should be understood that the scope of the invention is not departed from by substituting for the starting isocyanic ester the reactants required for the synthesis thereof in situ, i.e. the corresponding amine and phosgene, the basicity of the medium being then provided by the amine itself.

According to a last characteristic of the present invention, it is advantageous, in the preparation procedure, to introduce the isocyanate, or the materials required for its synthesis in situ, gradually into the reaction medium in order to obtain maximum yield.

The following examples are only serving descriptive purposes to better illustrate the present invention and should not be interpreted as limiting the invention to either products and preparation procedures used or compounds obtained.

Example 1

A solution of 129 g. of 99.5% isocyanuric acid in 2,000 cm.³ of anhydrous dimethyl formamide, to which 20 g. of trimethylbenzylammonium hydroxide are added, is heated with reflux. There are gradually added during 60 minutes while stirring 470 g. of p-chlorophenylisocyanate heated with reflux during 60 minutes at 175±5° C. The mixture is concentrated under reduced pressure to substantially half of the value thereof. After refrigerating, filtering, recrystallizing in dimethyl formamide, washing with ether on a filter and drying, 365 g. of tris-1,3,5-(N-p-chlorophenylcarbamyl) triazine 2,4,6-trione of 99.0% purity are obtained. The yield is 62.0% with respect to the starting isocyanuric acid and isocyanate.

The elemental composition of the product obtained compared with the theoretical one is as follows.

Theoretical: 48.9% of C, 2.6% of $H_2$, 14.3% of $N_2$, 18.06% of Cl. Analytical: 49.05% of C, 2.55% of $H_2$, 14.25% of $N_2$, 18.12% of Cl.

Identical results are obtained by substituting an equal amount of triethylamine for trimethylbenzylammonium hydroxide.

Example 2

By operating under the conditions described in the preceding example, with 129 g. of isocyanuric acid in solution in 2,000 cm.³ of dimethyl formamide, containing 20 g. of trimethylbenzylammonium hydroxide gradually mixed with 320 g. of p-chlorophenylisocyanate, 306 g. of bis-1,3-(N-p-chlorophenylcarbamyl) triazine 2,4,6-trione of 99.0% purity are obtained. The yield is 70.2% with respect to the starting reactants and the elemental composition of the product compared with the theoretical one is as follows.

Theoretical: 46.8% of C, 2.5% of $H_2$, 16.0% of $N_2$, 16.3% of Cl. Analytical: 26.95% of C, 2.53% of H₂, 15.80% of N₂, 16.45% of Cl.

Example 3

The p-chlorophenylisocyanate of the preceding examples is replaced by 368 g. of phenylisocyanate, all the other conditions remaining unchanged, and at the end of the operation 367 g. of practically pure tris-1,3,5-(N-phenylcarbamyl) triazine 2,4,6-trione are obtained with a 74.0% yield.

Example 4

The same operation is carried out as described in the preceding examples, with the same amounts of isocyanuric acid, solvent and organic base, gradually being mixed with 220 g. of ethylisocyanate. The operation is then carried out in a 5-litre autoclave under the autogenous pressure at 160° C. and the product is treated as in the preceding examples.

A product of 187 g. of tris-1,3,5-(N-ethylcarbamyl) triazine 2,4,6-trione, corresponding to a 55.0% yield is thus obtained.

The elemental composition of the product, compared with the theoretical one, is as follows.

Theoretical: 42.10% of C, 5.26% of H₂, 24.56% of N₂. Analytical: 42.02% of C, 5.21% of H₂, 24.45% of N₂.

Example 5

A solution of 387 g. of isocyanuric acid in 6,000 cm.³ of dimethyl formamide is saturated with phosgene, and a solution of 1,500 g. of p-nitroaniline in 2,000 cm.³ of dimethyl formamide is gradually added therein over 2 to 3 hours while stirring, the addition of phosgene being carried out during the 2 to 3 hours and also during 15 additional minutes. The reaction medium thus constituted is heated with reflux to 170–180° C. for one hour, then concentrated in vacuo, refrigerated and filtered. The dried product containing the tris-1,3,5-(N-p-nitrophenylcarbamyl) triazine 2,4,6-trione, the p-nitroaniline hydrochlorate and the p′,p-dinitrodiphenyl urea is extracted with carbon tetrachloride and yields, after evaporating the solvent, 1,275 g. of the 96.0% purity product desired with a 68.5% yield. The product is obtained in the perfectly pure state after recrystallizing in carbon tetrachloride or dimethyl formamide, the overall yield of 100% tris - 1,3,5 - (N-p-nitrophenylcarbamyl) triazine 2,4,6-trione being then 60.3%.

Example 6

One mole (129 g.; 99.5%) isocyanuric acid is dissolved in 2,000 cc. of anhydrous dimethylformamide mixed with 20 g. of trimethyl benzyl ammonium hydroxide. The solution is refluxed to 55±5° C. and 3.1 moles (350 g.) of isoamyl isocyanate are gradually added thereto. The mixture is then heated under reflux for 60 minutes to 175±5° C. After concentrating under reduced pressure down to half the volume, cooling, filtering, recrystallizing in dimethylformamide, washing with ether on a filter, and drying, a product of 243 g. of tris-1,3,5-(N-isoamyl carbamyl) triazine 2,4,6-trione is obtained with a 52% yield. The analysis is:

Theoretical: 53.8% of C, 7.7% of H₂, 17.9% of N₂. Analytical: 53.4% of C, 7.5% of H₂, 17.95% of N₂.

Example 7

Utilizing the procedure of Example 6, 3.1 moles (431 g.) of 4-isocyanate 3-heptene is reacted with 1 mole of the isocyanuric acid. A product of 317 g. of tris-1,3,5-(N-3-heptene carbamyl) triazine 2,4,6-trione is obtained with a yield of 58%. The analysis is:

Theoretical: 59.3% of C, 7.6% of H₂, 15.4% of N₂. Analytical: 58.6% of C, 7.5% of H₂, 15.2% of N₂.

Example 8

Following the process of Example 6, the 1 mole of isocyanuric acid is reacted with 3.1 moles (381 g.) of 1-isocyanate 1,2-cyclohexene. The resultant product of 304 g. of tris-1,3,5-(N-1,2-cyclohexene carbamyl) triazine 2,4,6-trione is obtained in a yield of 61%. The analysis is:

Theoretical: 57.8% of C, 6.0% of H₂, 16.9% of N₂. Analytical: 58.2% of C, 6.2% of H₂, 16.7% of N₂.

As indicated above, particularly useful compounds are those with derivatives wherein the monovalent radical R contains heteroatoms, such as phosphorus, the halogens, silicon, etc. resulting from the reaction between cyanuric acid and heteroesters of isocyanic acid of the type $(R')_2PO)NCO$, $RSO_2(NCO)$, $C_nF_{2n+1}(NCO)$ etc.

The following examples of embodiment are given to further illustrate the invention, it being well understood that the invention is, generally speaking, concerned with all the derivatives of the type described in the examples and obtained from any isocyanic ester containing one or more heteroatoms in the molecule thereof.

Example 9

One mole of isocyanuric acid is dissolved in 2,000 cm.³ of dimethyl formamide and the solution is poured into a flask fitted with an upward cooler and a stirring device.

After raising the pH to a value above 12 by adding 20 g. of trimethylbenzylammonium hydroxide and the medium to about 60° C., 3.05 moles of para-tolylsulfonylisocyanate are gradually added. Such an operation will take about 30 minutes. After being maintained at 170±5° C. for one hour, the product is concentrated by evaporation to reduce the volume by half, then refrigerated and filtered. A product of 474 g. of tris-1,3,5-(N-para - tolylsulfonylcarbamyl) triazine 2,4,6 - trione of 99.0% purity is obtained which corresponds to a 65.0% yield with respect to the starting isocyanate and isocyanuric acid.

The formula of this product that may be represented as hereunder:

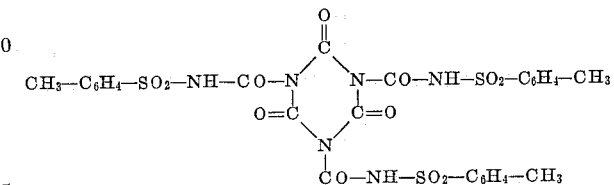

is confirmed by the elemental analysis as follows:

Theoretical, percent: C, 45.0; H, 3.3; N, 11.7; O, 26.7; S, 13.3. Experimental, percent: C, 44.8; H, 3.3; N, 11.9; O, 27.0; S, 13.0.

Example 10

According to the same procedure as in Example 9, 3.1 moles of trifluoroethyl isocyanate and 1.0 mole of isocyanuric acid in solution in 2,000 cm.³ of dimethyl formamide are reacted in the presence of 20 g. of trimethylbenzylammonium hydroxide.

A product of 302 g. of tris-1,3,5-(N-trifluoroethyl carbamyl) triazine 2,4,6-trione of 99.0% purity is obtained with a 60.0% yield with respect to the starting isocyanate and cyanuric acid.

By comparing the results of elemental analysis with the theoretical ones as follows:

Theoretical, percent: C, 28.6; H, 1.8; F, 33.9; N, 16.6; O, 19.1. Experimental, percent: C, 28.3; H, 1.7; F, 34.04; N, 16.8; O, 19.2; it is possible to make out the developed formula hereunder

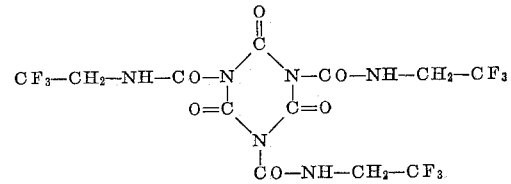

Example 11

Following the procedure of Example 9, 8.1 moles (486 g.) of dimethoxy-phosphoryl isocyanate and 1 mole of isocyanuric acid in solution are reacted in the presence of 20 g. of trimethylbenzylammonium hydroxide. A product of 233 g. of 1,3,5-tris-(N-dimethoxy-phosphoryl carbamyl) triazine 2,4,6-trione is obtained in a 40% yield and having an analysis of:

Theoretical, percent: C, 24.7; $H_2$, 3.6; $N_2$, 14.4; P, 16.0.
Experimental, percent: C, 24.3; $H_2$, 3.5; $N_2$, 14.3; P, 16.3.

It will be obvious to those skilled in the art that various changes may be made without departing from the spirit of the invention and therefore the invention is not limited to what is described in the specification, but only as indicated in the appended claims.

What is claimed is:

1. The isocyanuric acid (carbamyl N-substituted) bis- and tris-N-derivatives selected from the developed formula consisting of

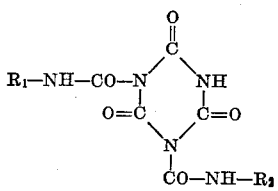

and

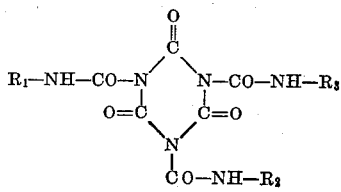

wherein $R_1$, $R_2$, and $R_3$ represent monovalent radicals selected from the group consisting of aliphatic residues of 1–7 carbon atoms, alicyclic residues of six carbon atoms, and arylalkyl residues of 7–9 carbon atoms.

2. A compound in accordance with claim 1, wherein one of said residues is substituted with a member selected from the group consisting of $-SO_2R$, $-PO(R')_2$ and $-C_nF_{2n+1}$, obtained by reacting cyanuric acid and hetero-esters of isocyanic acid of the type $RSO_2(NCO)$, $(R')_2PO(NCO)$ and $C_nF_{2n+1}(NCO)$ wherein R is an arylalkyl of 7–9 carbon atoms, R' is a lower alkoxy, and n is an integer of 1–3.

3. A compound in accordance with claim 2, wherein said substituents are selected from the group consisting of $-SO_2-C_6H_4-CH_3$, $-PO(OCH_3)_2$ and $-CH_2-CH_3$.

4. A compound in accordance with claim 1 wherein $R_1$, $R_2$ and $R_3$ are identical.

5. Bis-N-substituted 1,3-carbamyl triazine 2,4,6-trione in accordance with claim 1.

6. Tris-N-substituted 1,3,5-carbamyl triazine 2,4,6-trione in accordance with claim 1.

7. Tris-1,3,5-(N-p-chlorophenylcarbamyl) triazine 2,4,6-trione.

8. Bis-1,3-(N-chlorophenylcarbamyl) triazine 2,4,6-trione.

9. Tris-1,3,5-(N-phenylcarbamyl) triazine 2,4,6-trione.

10. Tris-1,3,5-(N-ethylcarbamyl) triazine 2,4,6-trione.

11. Tris-1,3,5-(N-p-nitrophenylcarbamyl) triazine 2,4,6-trione.

12. Tris-1,3,5 - (N - p - tolylsulfonylcarbamyl) triazine 2,4,6-trione.

13. Tris-1,3,5-(N-trifluoroethylcarbamyl) triazine 2,4,6-trione.

14. Tris-1,3,5-(N-isoamylcarbamyl) triazine 2,4,6-trione.

15. Tris-1,3,5-(N-3-heptenecarbamyl) triazine 2,4,6-trione.

16. Tris-1,3,5-(N-1,2-cyclohexene carbamyl) triazine 2,4,6-trione.

17. Tris-1,3,5-(N-dimethoxy phosphoryl carbamyl) triazine 2,4,6-trione.

References Cited

UNITED STATES PATENTS 2,801,244  7/1957  Balon _____ 260—248
3,211,704  10/1965  Gilman et al. _____ 260—248

WALTER A. MODANCE, *Primary Examiner.*

JOHN M. FORD, *Assistant Examiner.*